US008731616B2

(12) United States Patent
Kenington et al.

(10) Patent No.: US 8,731,616 B2
(45) **Date of Patent: *May 20, 2014**

(54) ACTIVE ANTENNA ARRAY AND METHOD FOR RELAYING FIRST AND SECOND PROTOCOL RADIO SIGNALS IN A MOBILE COMMUNICATIONS NETWORK

(75) Inventors: Peter Kenington, Chepstow (GB); Martin Weckerle, Ulm (DE); Dirk Neumann, Ulm (DE)

(73) Assignee: Kathrein -Werke KG, Rosenheim (DE)

( * ) Notice: Subject to any disclaimer, the term of this patent is extended or adjusted under 35 U.S.C. 154(b) by 1008 days.

This patent is subject to a terminal disclaimer.

(21) Appl. No.: 12/648,773

(22) Filed: Dec. 29, 2009

(65) Prior Publication Data

US 2011/0159808 A1 Jun. 30, 2011

(51) Int. Cl.

| | |
|---|---|
| ***H04B 17/00*** | (2006.01) |
| ***H04W 24/00*** | (2009.01) |
| ***H04M 1/00*** | (2006.01) |
| ***H04B 1/38*** | (2006.01) |
| ***H01Q 3/00*** | (2006.01) |
| ***H01Q 21/00*** | (2006.01) |
| ***H04W 4/00*** | (2009.01) |
| ***H04L 5/16*** | (2006.01) |

(52) U.S. Cl.

USPC .................... 455/562.1; 455/67.14; 455/424; 455/561; 342/368; 342/372; 342/373; 343/853; 370/328; 370/331; 375/219

(58) Field of Classification Search

CPC ..... H04W 24/00; H04W 88/08; H04W 16/28; H04B 24/08; H04B 1/3838; H01Q 1/246; H01Q 1/245

USPC .......... 455/7, 17, 18, 25, 67.14, 91, 403, 424, 455/436, 445, 446, 448, 550, 561, 562.1, 455/575.5, 11.1, 13.3, 423; 342/367, 368, 342/372, 375, 376, 154, 174, 354; 343/700 MS, 844, 853, 797, 850; 370/277, 328, 401, 315, 465; 375/219

See application file for complete search history.

(56) References Cited

U.S. PATENT DOCUMENTS

| | | | |
|---|---|---|---|
| 4,424,500 | A | 1/1984 | Viola et al. |
| 4,638,317 | A | 1/1987 | Evans |

(Continued)

FOREIGN PATENT DOCUMENTS

| | | |
|---|---|---|
| WO | 99/17576 | 4/1999 |

OTHER PUBLICATIONS

U.S. Appl. No. 12/563,693, entitled: Antenna Array, Network Planning System, Communication Network and Method for Relaying Radio Signals With Independently Configurable Beam Pattern Shapes Using a Local Knowledge, Sep. 21, 2009.

*Primary Examiner* — Bobbak Safaipour
*Assistant Examiner* — Paul P Tran
(74) *Attorney, Agent, or Firm* — Stephen H. Eland; Dann, Dorfman, Herrell & Skillman

(57) ABSTRACT

The present disclosure teaches an active antenna array for a mobile communications network. The active antenna array comprises a plurality of antenna elements, at least one first splitter, at least one amplifier and at least one first coupler. The first splitter forwards at least one of at least one individual first protocol receive signal and at least one individual second protocol receive signal in a receive direction from an individual one of the plurality of antenna elements. The at least one amplifier amplifies at least one of the individual first protocol receive signal and the individual second protocol receive signal. The at least one first coupler is located in the receive direction downstream of the at least one amplifier and is adapted to forward the at least one individual second protocol receive signal to a second protocol receiver.

18 Claims, 5 Drawing Sheets

(56) References Cited

U.S. PATENT DOCUMENTS

| | | | | |
|---|---|---|---|---|
| 5,461,389 | A * | 10/1995 | Dean | 342/375 |
| 5,675,629 | A * | 10/1997 | Raffel et al. | 455/552.1 |
| 5,812,088 | A | 9/1998 | Pi et al. | |
| 6,067,054 | A | 5/2000 | Johannisson et al. | |
| 6,081,233 | A | 6/2000 | Johannisson | |
| 6,094,165 | A * | 7/2000 | Smith | 342/373 |
| 6,282,434 | B1 | 8/2001 | Johannisson et al. | |
| 6,442,371 | B1 | 8/2002 | Lyu | |
| 6,640,110 | B1 | 10/2003 | Shapira et al. | |
| 6,785,559 | B1 | 8/2004 | Goldberg et al. | |
| 7,043,270 | B2 | 5/2006 | Judd et al. | |
| 7,069,053 | B2 * | 6/2006 | Johannisson et al. | 455/562.1 |
| 7,236,131 | B2 | 6/2007 | Fager et al. | |
| 7,236,807 | B1 | 6/2007 | Shapira et al. | |
| 7,439,901 | B2 * | 10/2008 | Needham et al. | 342/30 |
| 7,583,982 | B2 | 9/2009 | Olesen et al. | |
| 7,817,096 | B2 | 10/2010 | Linehan | |
| 8,064,958 | B2 | 11/2011 | Skarby et al. | |
| 8,208,962 | B2 | 6/2012 | Thomas | |
| 8,228,840 | B2 * | 7/2012 | Skarby | 370/328 |
| 8,320,825 | B2 | 11/2012 | Goransson et al. | |
| 2004/0204109 | A1 | 10/2004 | Hoppenstein | |
| 2008/0225775 | A1 * | 9/2008 | Proctor et al. | 370/315 |
| 2008/0254845 | A1 | 10/2008 | Chang et al. | |
| 2008/0318632 | A1 * | 12/2008 | Rofougaran et al. | 455/562.1 |
| 2009/0181722 | A1 * | 7/2009 | Stensson | 455/562.1 |
| 2010/0117913 | A1 * | 5/2010 | Jung | 343/724 |

* cited by examiner

ACTIVE ANTENNA ARRAY AND METHOD FOR RELAYING FIRST AND SECOND PROTOCOL RADIO SIGNALS IN A MOBILE COMMUNICATIONS NETWORK

CROSS-REFERENCE TO RELATED APPLICATIONS

The present application is related to U.S. patent application Ser. No. 12/648,713 entitled "Active Antenna Array with Multiple Amplifiers for a Mobile Communications Network and Method of Providing DC Voltage to at least one Processing Element" filed Dec. 29, 2009, which is incorporated in its entirety. The present application is further related to U.S. patent application Ser. No. 12/648,852 entitled "Active Antenna Array for a Mobile Communications Network with Multiple Amplifiers Using Separate Polarisations for Transmission and a Combination of Polarisations for Reception of Separate Protocol Signals" filed Dec. 29, 2009, which is incorporated in its entirety. The present application is further related to U.S. patent application Ser. No. 12/648,809 entitled "A Method and Apparatus for Tilting Beams in a Mobile Communications Network" filed Dec. 29, 2009, which is incorporated in its entirety.

FIELD OF THE INVENTION

The field of the invention relates to an active antenna array for a mobile communications network and a method for relaying radio signals in a mobile communications network.

BACKGROUND OF THE INVENTION

The use of mobile communications networks has increased over the last decade. Operators of the mobile communications networks have increased the number of base stations in order to meet an increased request for service by users of the mobile communications networks. The operators of the mobile communications network wish to reduce the running costs of the base station. It is one option to implement the radio system as an antenna-embedded radio forming an active antenna array of the present disclosure. The antenna-embedded radio may be implemented on a chip, at least for some of the components of the antenna embedded radio. The antenna-embedded radio reduces the space needed to house the hardware components of the base station. Power consumption during normal operation of the active antenna array is reduced when implementing the active antenna array on a chip.

The mobile communications networks use protocols when relaying radio signals. Examples of first types of protocols used in the mobile communications system are the GSM protocol and a UMTS protocol but are not limited thereto.

New types of protocols for radio signals (or pertaining to radio signals) in mobile communication networks have been developed in order to meet an increased need of mobile communication and to provide higher data rates to handsets as well as an increased flexibility in adapting radio signals relayed by the active antenna array to specific needs of an individual site or cell of the mobile communications network.

Examples for a second (new) type of protocol pertaining to second protocol radio signals include the unified mobile telecommunication service protocol (UMTS), a third generation long term evolution (3GLTE) protocol, a freedom of mobile multi media access radio (FMRA) protocol, a wideband code division multiple access (WCDMA) protocol, and a Worldwide Interoperability for Microwave Access (WiMAX) protocol, but are not limited thereto.

Radio signals using the first protocol shall be referred to herein as first protocol radio signals. Radio signals using the second protocol shall be referred to herein as second protocol radio signals.

The operators of the mobile telecommunications networks are interested in supporting the first protocol radio signals and the second protocol radio signals. Therefore an interest exists to provide active and/or passive antenna arrays relaying both the first protocol radio signals and the second protocol radio signals.

The second protocol radio signals often require flexibility in beam shaping not often required with the first protocol radio signals.

In the prior art it was possible to provide an active antenna array for the second protocol radio signals and a further antenna array relaying the first protocol radio signals. Such an approach is rather expensive for the operators of the mobile communications network as two separate sets of the antenna arrays need to be setup and maintained.

Combined passive antenna arrays for the mobile communications networks are known relaying the first protocol radio signals and the second protocol radio signals concurrently. These combined antenna arrays of the prior art unfortunately do not provide the increased flexibility in terms of beam shaping as is often required with the second protocol radio signals.

FIG. 1 shows a passive antenna array 1*a* of the prior art. The passive antenna array 1*a* of the prior art is adapted to relay two different air interface standards (also referred to as a first protocol pertaining to a first protocol radio signal, for example GSM or UMTS but not limited thereto and a second protocol pertaining to a second protocol radio signal). The second protocol pertaining to the second protocol radio signal may be UMTS or LTE but is not limited thereto.

The first protocol radio signal comprises a general first protocol transmit signal 70Tx and a general first protocol receive signal 70Rx. The second protocol radio signal comprises a general second protocol transmit signal 75Tx and a general second protocol receive signal 75Rx. The general first protocol transmit signal 70Tx and the general first protocol receive signal are present between a first protocol base transceiver station (BTS) 10-1 and a duplexer 20. The general second protocol transmit signal 75Tx and the general second protocol receive signal 75Rx are present between a second protocol base transceiver station (BTS) 10-2 and the duplexer 20. The duplexer 20 combines the general first protocol transmit signal 70Tx and the general second protocol transmit signal 75Tx with a low combiner loss. The low combiner loss is much lower than a loss present with a 3 dB hybrid or Wilkinson combiner. It is a disadvantage of the duplexer 20 to require a roll-off band between the general first protocol transmit signal 70Tx and the general second protocol transmit signal 75Tx as well as between the general first protocol receive signal 70Rx and the general second protocol receive signal 75Rx. The duplexer 20 separates a general first protocol receive signal 70Rx and a general second protocol receive signal 75Rx such that the general first protocol receive signal 70Rx reaches the first protocol BTS 10-1 and the general second protocol receive signal 75Rx reaches the second protocol BTS 10-2.

The required roll-off of the prior art duplexer 20 represents a waste in bandwidth as the roll-off band is within a bandwidth of the first protocol radio signals and a bandwidth of the second protocol radio signals. Therefore it is expensive to use the duplexer 20 in terms of spectrum license fees, as the spectrum license fees also need to be paid for the roll-off band of the duplexer 20. The duplexer 20 is further inflexible with respect to frequency bandwidths for the first protocol radio signals and the second protocol radio signals. A bandwidth allocated to the first protocol radio signal and a bandwidth allocated to the second protocol radio signal are fixed different to the teachings of the present disclosure as will be explained below.

A coaxial feeder cable forwards the general first protocol transmit signal 70Tx and the general second protocol transmit signal 75Tx from a tower mounted amplifier (TMA) 80 to the antenna array 1*a*. The coaxial feeder cable further forwards a general first protocol receive signal 70Rx, and the second protocol receive signal 75Rx from the passive antenna array 1*a* to the TMA 80. The general first protocol transmit signal 70Tx is split into individual first protocol transmit signals 70Tx-1, 70Tx-2, . . . , 70Tx-N at a port 11 of the passive antenna array 1*a* reaching an individual one of the antenna elements Ant-1, Ant-2, . . . , Ant-N of the antenna array 1*a*. A corporate feed network is used for splitting the general first protocol transmit signal 70Tx into the individual first protocol transmit signals 70Tx-1, 70Tx-2, . . . , 70Tx-N. The corporate feed network is illustrated in FIG. 1 by the thick black lines within the body of the passive antenna array 1*a*. In FIG. 1 only 16 of the antenna elements Ant-1, ant-2, . . . , Ant-N are shown. The individual first protocol transmit signal 70Tx-1, 70Tx-2, . . . , 70Tx-N is only shown for the individual antenna elements Ant-1 and Ant-16 in FIG. 1 for the sake of clarity. The individual transmit signal 70Tx-1, 70Tx-2, . . . , 70Tx-N is typically present for each one of the antenna elements Ant-1, Ant-2, . . . , Ant-N.

The general second protocol transmit signal 75Tx is split into a plurality individual second protocol transmit signals 75Tx-1, 75Tx-2, . . . , 75Tx-N reaching the individual antenna element Ant-1, Ant-2, . . . , Ant-N of the antenna array 1*a*. The individual second protocol transmit signal 75Tx-1, 75Tx-2, . . . , 75Tx-N is only shown for the individual antenna elements Ant-1 and Ant-16 in FIG. 1 for the sake of clarity but may be present for more than two of the antenna elements Ant-1, Ant-2, . . . , Ant-N.

SUMMARY OF THE INVENTION

The present disclosure teaches an active antenna array for a mobile communications network. The active antenna array comprises a plurality of antenna elements, at least one first splitter, at least one amplifier and at least one first coupler. The plurality of antenna elements is adapted to relay first protocol radio signals and second protocol radio signals. The at least one first splitter is adapted to forward at least one of at least one individual first protocol receive signal and at least one individual second protocol receive signal in a receive direction from an individual one of the plurality of antenna elements. The at least one amplifier amplifies at least one of the at least one individual first protocol receive signal or the at least one individual second protocol receive signal downstream of the at least one first splitter. The at least one first coupler is located in the receive direction downstream of the at least one amplifier and is adapted to forward the at least one individual second protocol receive signal to a second protocol receiver.

The term "first protocol" pertaining to first protocol radio signals as used herein shall be construed as including the GSM protocol and the unified mobile telecommunication service protocol (UMTS) but is not limited thereto.

The term "second protocol" pertaining to a second protocol radio signal as used herein shall be construed as including the UMTS protocol, a third generation long term evolution (3 GLTE) protocol, a freedom of mobile multimedia access radio (FMRA) protocol and a wideband code division multiple access (WCDMA) protocol but is not limited thereto.

It is conceivable that a member of the group of first protocols may also be a member of the second group of protocols. The presence of a specific protocol in both of the group of first protocols and the group of second protocols may occur when using different variants of a protocol, such as UMTS and UMTS900 but is not limited thereto.

The term "phase weighting, amplitude weighting or delay" shall be construed as comprising a phase weighting, an amplitude weighting or a delay as provided by passive networks known in the art. The phase weighting, the amplitude weighting or the delay may comprise a set of possible parameter values for at least one of the phase weighting, the amplitude weighting or the delay. Typically, the passive networks known in the art prevent an arbitrary selection of the phase weighting, the amplitude weighting or the delay. Remote electrical tilt (RET) systems utilise electro-mechanically variable phase shift elements to vary a beam pattern relayed by the prior art antenna array 1*a*. RET systems will act on all transmit signals fed to the prior art antenna 1*a* and will not act separately for first protocol transmit signals 70Tx-1, 70Tx-2, . . . , 70Tx-N and second protocol transmit signals 75Tx-1, 75Tx-2, . . . , 75Tx-N. The phase weighting, the amplitude weighting or the delay are applied by analogue means.

The term "the variable phase weighting, the variable amplitude weighting or the variable delay" as used herein shall be construed as comprising not only a fixed set of possible parameter values for at least one of the variable amplitude weighting, the variable phase weighting and the variable delay. The variable phase weighting, the variable amplitude weighting or the variable delay provide an arbitrary selection of at least one of the phase weighting, the amplitude weighting or the delay between individual ones of the antenna elements. The variable phase weighting, the variable amplitude weighting or the variable delay are applied digitally. The variable phase weighting, the variable amplitude weighting or the variable delay may comprise a variation in time of at least one of the phase weighting, the amplitude weighting or the delay between the individual ones of the antenna elements.

The variable phase weighting, the variable amplitude weighting may also be provided by the multiplication of the relevant transmit and/or receive signal by 'beamforming vectors'. The 'beamforming vectors' are sets of coefficients which, when multiplied with the relevant transmit and/or receive signal, produce the required degree of at least one of the variable phase weighting, the variable amplitude weighting or the variable delay between individual ones of the antenna elements. Such multiplication may be provided vectorially, in either polar (amplitude and phase) format or in Cartesian (I/Q) format. In all cases, within the present disclosure, whenever (variable) phase weighting, (variable) amplitude weighting or (variable) delay are discussed, the use of 'beamforming vectors' to generate such modifications is explicitly included. Details about the concept of 'beamforming vectors' are given in an earlier application U.S. Ser. No. 12/563,693 entitled "Antenna array, network planning system, communication network and method for relaying radio signals with independently configurable beam pattern shapes using a local knowledge"; which is incorporated herein in its entirety.

The term "receive direction" as used herein shall be construed as a direction running from an individual antenna element to the amplifier. In other words the receive direction describes a direction in which receive signals travel after being received by the antenna element.

The term "transmit direction" as used herein shall be construed as running from the first port to a second splitter, further to a first coupler, from there to the first splitter reaching the antenna element. In other words the transmit direction describes a direction along which transmit signals travel from the first port until the transmit signals are transmitted by the antenna element.

The term "first protocol radio signal" shall be construed comprising at least one of: a general first protocol transmit signal 70Tx, a general first protocol receive signal 70Rx, and an at least one individual first protocol transmit signal 70Tx-1, 70Tx-2, . . . , 70Tx-N and the at least one individual first protocol receive signal 70Rx-1, 70Rx-2, . . . , 70Rx-N.

The term "second protocol radio signal" shall be construed comprising at least one of a general second protocol transmit signal 75Tx, a general second protocol receive signal 75Rx, an at least one individual second protocol transmit signal 75Tx-1, 75Tx-2, . . . , 75Tx-N and the at least one individual second protocol receive signal 75Rx-1, 75Rx-2, . . . , 75Rx-N.

The present disclosure further teaches a method for relaying first protocol radio signals and second protocol radio signals in a mobile communications network. The method comprises a step of concurrently receiving at least one individual first protocol receive signal and at least one individual second protocol receive signal in a plurality of receive paths. The method further comprises a step of amplifying the at least one individual first protocol receive signal and the at least one individual second protocol receive signal. The method further comprises a step of forming a general first protocol receive signal from the at least one individual first protocol receive signal by analogue means, applying at least one of a phase weighting, an amplitude weighting or a delay to at least a selected one of the at least one individual first protocol receive signal. The method comprises a step of forming a general second protocol receive signal from the at least one individual second protocol receive signal by digitally applying at least one of a variable phase weighting, a variable amplitude weighting or a variable delay to at least a selected one of the at least one individual second protocol receive signal.

The present disclosure further teaches a computer program product comprising a computer useable medium having a control logic stored therein for causing a computer to manufacture the active antenna array for a mobile communications network of the present disclosure.

The present disclosure further teaches a computer program product comprising a computer useable medium have an control logic stored therein for causing a computer to execute the method for relaying first protocol radio signals and second protocol radio signals in a mobile communications network.

The present disclosure further teaches a chipset for controlling the active antenna array for a mobile communications network.

DETAILED DESCRIPTION OF THE INVENTION

Figure 2:
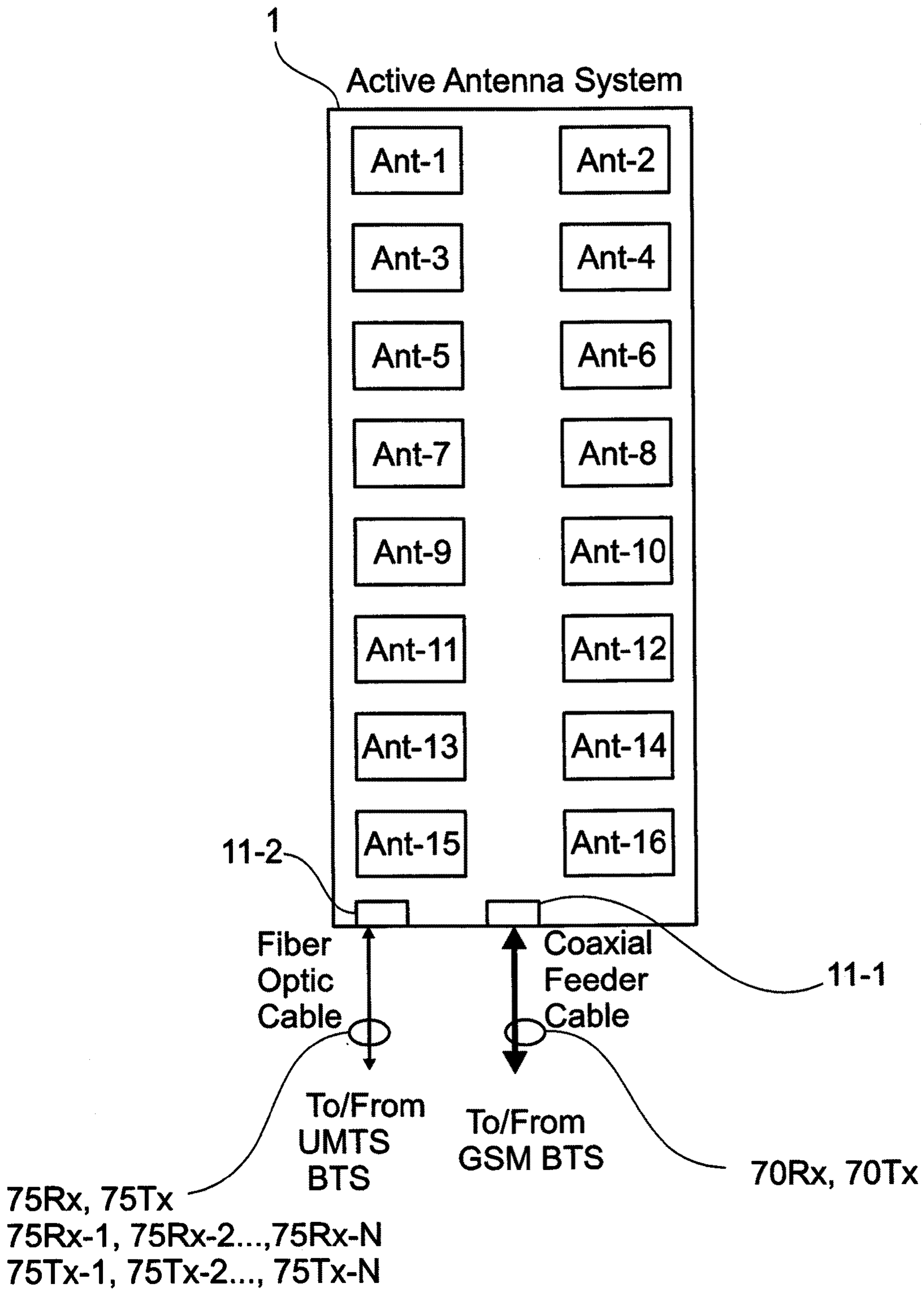
FIG. 2 shows the active antenna array

FIG. 2 shown an outline of the active antenna array 1 of the present disclosure. The active antenna array 1 allows an existing first protocol BTS 10-1 to be used with an antenna embedded radio for the second protocol radio signals, such as UMTS signals. The active antenna array 1 has two ports. A first port 11-1 is fed with the general first protocol transmit signal 70Tx. The first port 11-1 further provides the general first protocol receive signal 70Rx. Typically the coaxial feeder cable is connected to the first port 11-1. The coaxial feeder cable ending at the first port 11-1 carries the general first protocol transmit signal 70Tx and the general first protocol receive signals 70Rx. The first protocol transmit signal 70Tx is typically substantially higher in power than the general receive signal 70Rx. There may be two or more orders of magnitude in power between the general first protocol transmit signal 70Tx and the general first protocol receive signal 75Rx. The coaxial feeder cable is typically present in antenna arrays 1*a* of the prior art in combination with the first protocol radio signals.

A second port 11-2 is a digital port, for example using a fibre-optic cable. The fibre optic-cable carries the second protocol signals, using the CPRI, OBSAI or P-OBRI standards, or another digital interface protocol. The second protocol signals are typically provided at digital baseband. Active electronics in the active antenna array 1 perform functions including: Crest factor reduction, beamforming, predistortion, up conversion/down conversion to/from radio frequency (RF), power amplification etc. Without any limitation the second protocol signals may be provided at an intermediate frequency band between the base band and a transmit frequency band of the active antenna array 1.

As mentioned before the second protocol signals comprise the general second protocol transmit signal 75Tx and the general second protocol receive signal 75Rx. Without any limitation it is possible for the second port 11-2 to receive the individual second protocol transmit signals 75Tx-1, 75Tx-2, . . . , 75Tx-N and/or the general second protocol transmit signal 75Tx. It is also possible for the second port 11-2 to provide the individual second protocol receive signals 75Rx-1, 75Rx-2, . . . , 75Rx-N and/or the general second protocol receive signal 75Rx, as shall be explained further down.

The individual second protocol transmit signals 75Tx-1, 75Tx-2, . . . , 75Tx-N are forwarded to the individual ones of the antenna elements Ant-1, Ant-2, . . . , Ant-N as will be explained below. Likewise the individual second protocol receive signals 75Rx-1, 75Rx-2, . . . , 75Rx-N are received at the individual one of the antenna elements Ant-1, Ant-2, . . . , Ant-N and forwarded to a second protocol receiver 210 (or transceiver, see FIG. 3). The fibre-optic cable may carry the second protocol radio signals in an open base station architecture initiative (OBSAI) format or a common public radio interface (CPRI) format but is not limited thereto. The fibre-optic cable ending at the second port 11-2 may be used to relay second protocol radio signals to and from active circuits within the active antenna array 1 as will be explained later. The fibre-optic cable may be replaced by any other suitable link and is only given as one example of the suitable link ending at the second port 11-2.

Figure 3:
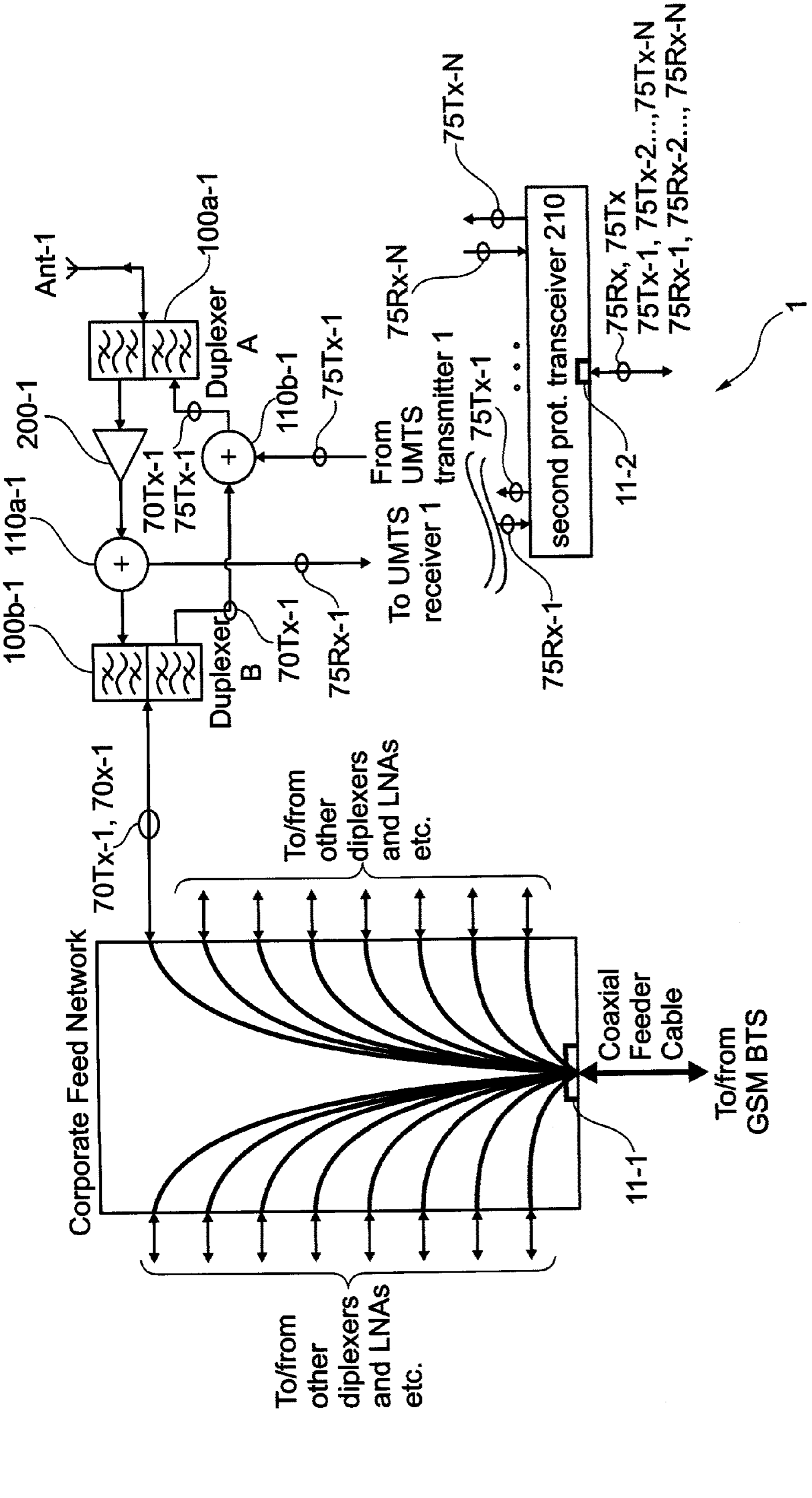
FIG. 3 shows details of the active antenna array for an individual one of the antenna elements

FIG. 3 shows details of the active antenna array 1 of the present disclosure.

The individual antenna element Ant-1, Ant-2, . . . , Ant-N receives an individual first protocol receive signal 70Rx-1, 70Rx-2, . . . , 70Rx-N and/or an individual second protocol receive signal 75Rx-1, 75Rx-2, . . . , 75Rx-N both of which are filtered by a first splitter 100*a*-1, 100*a*-2, . . . , 100*a*-N. The first splitter 100*a*-1, 100*a*-2, . . . , 100*a*-N may be implemented as a duplexer, a quadrature hybrid, a directional coupler or a circulator, but is not limited thereto. The first splitter 100*a*-1, 100*a*-2, . . . , 100*a*-N prevents the individual first protocol receive signal 70Rx-1, 70Rx-2, . . . , 70Rx-N and/or the individual second protocol receive signal 75Rx-1, 75Rx-2, . . . , 75Rx-N from entering a transmit path reaching the first splitter 100*a*-1, 100*a*-2, . . . , 100*a*-N. Any receive signals entering the transmit path will cause a loss in signal strength of the individual first protocol receive signal 70Rx-1, 70Rx-2, . . . , 70Rx-N and/or the second protocol receive signal 75Rx-1, 75Rx-2, . . . , 75Rx-N. The first splitter 100*a*-1, 100*a*-2, . . . , 100*a*-N forwards the individual first protocol receive signal 70Rx-1, 70Rx-2, . . . , 70Rx-N and/or the individual second protocol receive signal 75Rx-1, 75Rx-2, . . . , 75Rx-N to an amplifier 200-1, 200-2, . . . , 200-N downstream of the first splitter 100*a*-1, 100*a*-2, . . . , 100*a*-N along the receive direction. The amplifier 200-1, 200-2, . . . , 200-N amplifies the individual first protocol receive signal 70Rx-1, 70Rx-2, . . . , 70Rx-N and/or the individual second protocol receive signal 75Rx-1, 75Rx-2, . . . , 75Rx-N.

A first coupler 110*a*-1, 110*a*-2, . . . , 110*a*-N splits the individual first protocol receive signal 70Rx-1, 70Rx-2, . . . , 70Rx-N and/or the individual second protocol receive signal 75Rx-1, 75Rx-2, . . . , 75Rx-N into two paths. A first path goes to a second splitter 100*b*-1, 100*b*-2, . . . , 100*b*-N. The second path goes from the first coupler 110*a*-1, 110*a*-2, . . . , 110*a*-N to the second protocol receiver shown as the second protocol transceiver 210 for the individual one of the antenna element Ant-1, Ant-2, . . . , Ant-N. There may be an individual second protocol receiver for one or more of the antenna elements Ant-1, Ant-2, . . . , Ant-N. Alternatively, the second protocol receiver may comprise an individual second protocol receiver for one or more of the individual second protocol receive signals 75Rx-1, 75Rx-2, . . . , 75Rx-N.

It is further conceivable that the second protocol receiver is implemented as a second protocol transceiver 210 as shown in FIG. 3. The second protocol transceiver 210 may comprise an individual second protocol receiver for each one of the individual second protocol receive signals 75Rx-1, 75Rx-2, . . . , 75Rx-N. Alternatively, the second protocol transceiver 210 may be comprising a receiver for two or more of the individual second protocol receive signals 75Rx-1, 75Rx-2, . . . , 75Rx-N.

The second protocol transceiver 210 provides at least one of the individual second protocol transmit signals 75Tx-1, 75Tx-2, . . . , 75Tx-N.

The first path reaches the second splitter 100*b*-1, 100*b*-2, . . . , 100*b*-N, with the individual first protocol receive signals 70Rx-1, 70Rx-2, . . . , 70Rx-N traversing it and going on to be combined by the passive feeder network or the passive feeder cable, thereby providing the general first protocol receive signal 70Rx at the coaxial feeder cable connected to the first port 11-1. It may be necessary to apply a filter (not shown) to the general first protocol receive signals 70Rx in order to eliminate any components of the second protocol receive signal 75Rx-1, 75Rx-2, . . . , 75Rx-N, although this is typically contained within the first protocol base-station transceiver. Without any limitation the second splitter 100*b*-1, 100*b*-2, . . . , 100*b*-N may provide the filtering such that individual second protocol receive signals 75Rx-1, 75Rx-2, . . . , 75Rx-N are removed and only the first protocol receive signal 70Rx-1, 70Rx-2, . . . , 70Rx-N is forwarded to the feeder network ending at the first port 11-1. The second splitter 100*b*-1, 100*b*-2, . . . , 100*b*-N may comprise a duplexer, a circulator, a directional coupler, a quadrature hybrid, as already mentioned for the first splitter 100*a*-1, 100*a*-2, . . . , 100*a*-N.

The second signal path from the first coupler 110*a*-1, 110*a*-2, . . . , 110*a*-N to the respective second protocol receiver or the second protocol receiver 210 may require the use of a filtering element to remove any components of the first protocol receive signal 70Rx-1, 70Rx-2, . . . , 70Rx-N, although such filters are likely to be incorporated in the second protocol receiver itself Filters adapted for this filtering are known in the art and not shown in FIG. 3.

The active antenna array 1 of the present disclosure is described in FIG. 3 using an example of an active transmit and receive antenna array 1. It is conceivable for the active antenna array 1 to have a receive-only functionality. For a receive-only aspect of the active antenna array 1, there will be no radio signals transmitted by the active antenna array 1, as will be described next.

A general first protocol transmit signal 70Tx is forwarded by the coaxial feeder cable to the first port 11-1 and split into individual first protocol transmit signals 75Tx-1, 75Tx-2, . . . , 75Tx-N by the coaxial passive feeder cable ('corporate feeder network') and relayed by the individual antenna arrays Ant-1, Ant-2, . . . , Ant-N. The coaxial passive feeder cable provides a 1:M relation between the general first protocol transmit signal 70Tx to the individual antenna elements Ant-1, Ant-2, . . . , Ant-N. M may be greater than one in the active antenna array 1. M may further match a number N of antenna elements Ant-1, Ant-2, . . . , Ant-N present in the active antenna array 1 or any other positive integer value.

It will be noted that the individual first protocol transmit signal 70Tx-1, 70Tx-2, . . . , 70Tx-N is only shown for an individual one of the antenna elements Ant-1, Ant-2, . . . , Ant-N, i.e. in FIG. 3 for Ant-1 only. For each one of the antenna elements Ant-1, Ant-2, . . . , Ant-N a corresponding arrangement may be used. The individual first protocol transmit signal 70Tx-1, 70Tx-2, . . . , 70Tx-N is forwarded to a second splitter 100*b*-1, 100*b*-2, . . . , 100*b*-N. The second splitter 100*b*-1, 100*b*-2, . . . , 100*b*-N forwards the individual first protocol transmit signal 70Tx-1, 70Tx-2, . . . , 70Tx-N in a transmit direction ending at the individual antenna element Ant-1, Ant-2, . . . , Ant-N. The second splitter 100*b*-1, 100*b*-2, . . . , 100*b*-N substantially attenuates power from the individual first protocol transmit signal 70Tx-1, 70Tx-2, . . . , 70Tx-N leaking into the receive path. This attenuation reduces the chance of possible damage to the amplifier 200-1, 200-2, . . . , 200-N or of causing distortion. The individual first protocol transmit signal 70Tx-1, 70Tx-2, . . . , 70Tx-N travels to a second coupler 110*b*-1, 110*b*-2, . . . , 110*b*-N. The second coupler 110*b*-1, 110*b*-2, . . . , 110*b*-N adds the individual second protocol transmit signal 75Tx-1, 75Tx-2, . . . , 75Tx-N to the individual first protocol transmit signal 70Tx-1, 70Tx-2, . . . , 70Tx-N. The individual first protocol transmit signal 70Tx-1, 70Tx-2, . . . , 70Tx-N and the individual second protocol transmit signal 75Tx-1, 75Tx-2, . . . , 75Tx-N are forwarded to the first splitter 100*a*-1, 100*a*-2, . . . , 100*a*-N. The first splitter 100*a*-1, 100*a*-2, . . . , 100*a*-N forwards the individual first protocol transmit signal 70Tx-1, 70Tx-2, . . . , 70Tx-N and the individual second protocol transmit signal 75Tx-1, 75Tx-2, . . . , 75Tx-N to the individual antenna element Ant-1, Ant-2, . . . , Ant-N. This is shown in FIG. 3 for Ant-1 only. The first coupler 100*a*-1, 100*a*-2, . . . , 100*a*-N substantially attenuates any of the individual first protocol transmit signal 70Tx-1, 70Tx-2, . . . , 70Tx-N or the individual second protocol transmit signal 75Tx-1, 75Tx-2, . . . , 75Tx-N, which enters the amplifier 200-1, 200-2, . . . , 200-N in the receive direction.

Let us now consider the general first protocol transmit signal 70Tx arriving at the first port 11-1. The general first protocol transmit signal 70Tx is forwarded using a high power RF coaxial feeder cable to the active antenna array 1. The high power RF coaxial feeder cable also carries the general first protocol receive signal 70Rx at a low power level, as explained earlier. Individual ones of the first protocol transmit signal 70Tx-1, 70Tx-2, . . . , 70Tx-N are derived using the corporate feeder network from the input 11-1 to the individual antenna elements Ant-1, Ant-2, . . . , Ant-N (i.e. a passive distribution) when the general first protocol transmit signal reaches the first port 11-1, as already explained in FIG. 1.

Such a passive distribution of the first protocol radio signals is not normally included in the active antenna array of the prior art, in which the prior art active antenna array relays only the second protocol radio signals (such as UMTS radio signals). The passive distribution of the first protocol radio signals needs to be added to the prior art active antenna array if the modified active antenna array is to be adapted to relay both the first protocol radio signals and the second protocol radio signals as described in the present disclosure.

In an antenna array 1*a* of the prior art (see FIG. 1) the individual first protocol transmit signal 70Tx-1, 70Tx-2, . . . , 70Tx-N would immediately reach the individual antenna element Ant-1, Ant-2, . . . , Ant-N.

The second splitter 100*b*-1, 100*b*-2, . . . , 100*b*-N separates the individual first protocol transmit signals 70Tx-1, 70Tx-2, . . . , 70Tx-N from any receive signals. The receive signals may comprise the individual first protocol receive signal 70Rx-1, 70Rx-2, . . . , 70Rx-N and/or the individual second protocol receive signal 75Rx-1, 75Rx-2, . . . , 75Rx-N that were amplified by the amplifier 200-1, 200-2, . . . , 200-N.

The individual first protocol transmit signal 75Tx-1, 75Tx-2, . . . , 75Tx-N is combined with the individual second protocol transmit signal 75Tx-1, 75Tx-2, . . . , 75Tx-N from a respective second protocol transmitter (not shown) present in the active antenna array 1. The respective second protocol transmitter may be co-located with the second protocol receiver when implemented as the second protocol transceiver 210. A combination of the individual first protocol transmit signal 70Tx-1, 70Tx-2, . . . , 70Tx-N and the individual second protocol transmit signal 75Tx-1, 75Tx-2, . . . , 75Tx-N may be achieved using a second coupler 110*b*-1, 110*b*-2, . . . , 110*b*-N in FIG. 3. The second coupler 110*b*-1, 110*b*-2, . . . , 110*b*-N could be a filter combiner, which would be of low loss, a hybrid combiner or a Wilkinson combiner, the latter having a higher loss, but is not limited thereto. The individual first protocol transmit signal 70Tx-1, 70Tx-2, . . . , 70Tx-N and the individual second protocol transmit signal 75Tx-1, 75Tx-2, . . . , 75Tx-N are forwarded to the first splitter 100*a*-1, 100*a*-2, . . . , 100*a*-N connecting the individual first protocol transmit signal 70Tx-1, 70Tx-2, . . . , 70Tx-N and/or the individual second protocol transmit signal 75Tx-1, 75Tx-2, . . . , 75Tx-N to the individual antenna element Ant-1, Ant-2, . . . , Ant-N. In FIG. 3 the individual antenna element is Ant-1. The individual antenna element Ant-1, Ant-2, . . . , Ant-N transmits the individual first protocol transmit signal 70Tx-1, 70Tx-2, . . . , 70Tx-N and the individual second protocol transmit signal 75Tx-1, 75Tx-2, . . . , 75Tx-N.

It is possible for the first splitter 100*a*-1, 100*a*-2, . . . , 100*a*-N and the second splitter 100*b*-1, 100*b*-2, . . . , 100*b*-N to be identical. It is not necessary and may be advantageous from a cost and/or loss perspective to make the first splitter 100*a*-1, 100*a*-2, . . . , 100*a*-N and the second splitter 100*b*-1, 100*b*-2, . . . , 100*b*-N different in their filtering characteristics. The first splitter 100*a*-1, 100*a*-2, . . . , 100*a*-N needs to be a high-specification splitter since performance of the second protocol receiver 210 partially depends on an accuracy of the first splitter 100*a*-1, 100*a*-2, . . . , 100*a*-N with respect to a filtering characteristic.

The second splitter 100*b*-1, 100*b*-2, . . . , 100*b*-N may not need as high a filtering performance as the first splitter 100*a*-1, 100*a*-2, . . . , 100*a*-N with respect to rejection of individual first protocol transmit signal 70Tx-1, 70Tx-2, . . . , 70Tx-N in the receive direction. The second splitter 100*b*-1, 100*b*-2, . . . , 100*b*-N is mainly required to protect the amplifier 200-1, 200-2, . . . , 200-N from damage possibly caused by the high power of the individual first protocol transmit signal 70Tx-1, 70Tx-2, . . . , 70Tx-N reaching the amplifier 200-1, 200-2, . . . , 200-N. It may be of interest to concentrate on low cost and low-loss of the second splitter 100*b*-1, 100*b*-2, . . . , 100*b*-N in the transmit direction from the second splitter 100*b*-1, 100*b*-2, . . . , 100*b*-N eventually reaching the individual antenna element Ant-1, Ant-2, . . . , Ant-N.

Figure 4B:
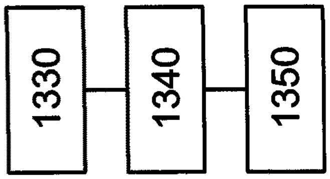
FIG. 4*b* shows details of a step of forwarding
Figure 4A:
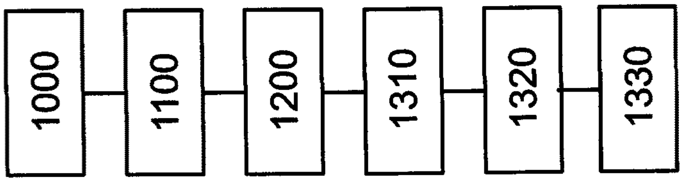
FIG. 4*a* shows a diagram for a method of relaying radio signals

FIG. 4*a* shows a diagram of a method 1000 for relaying radio signals in the mobile communications network. A step 1100 comprises concurrently receiving of the individual first protocol receive signal 70Rx-1, 70Rx-2, . . . , 70Rx-N and the individual second protocol receive signal 75Rx-1, 75Rx-2, . . . , 75Rx-N. The concurrently receiving step 1100 may use the individual one of the antenna element Ant-1, Ant-2, . . . , Ant-N, as shown in FIG. 3 for the example of the antenna element Ant-1.

The method 1000 comprises a step 1200 of amplifying the individual first protocol receive signal 70Rx-1, 70Rx-2, . . . , 70Rx-N and the individual second protocol receive signal 75Rx-1, 75Rx-2, . . . , 75Rx-N.

A step 1310 comprises a forming of the general first protocol receive signal 70Rx. The general first protocol receive signal 70Rx is formed from the individual ones of the first protocol receive signals 70Rx-1, 70Rx-2, . . . , 70Rx-N by analogue means, applying at least one of a phase weighting, an amplitude weighting or a delay to at least a selected one of the at least one individual first protocol receive signal 70Rx-1, 70Rx-2, . . . , 70Rx-N. By analogue means, applying at least one of the phase weighting, the amplitude weighting or the delay is known in the art and may be implemented by the corporate feeder network running from the first port 11-1 to the individual ones of the antenna elements Ant-1, Ant-2, . . . , Ant-N, but is not limited thereto.

A step 1320 comprises a forming of the general second protocol receive signal 75Rx. The general second protocol receive signal 75Rx is formed from the individual ones of the second protocol receive signals 75Rx-1, 75Rx-2, . . . , 75Rx-N by digitally applying at least one of the variable phase weighting, the variable amplitude weighting or the variable delay to at least the selected one of the at least one individual second protocol receive signal 75Rx-1, 75Rx-2, . . . , 75Rx-N. Digitally applying at least one of the variable phase weighting, the variable amplitude weighting or the variable delay is known in the art for the individual second protocol receive signals 75Rx-1, 75Rx-2, . . . , 75Rx-N and may be implemented using the second protocol receiver or transceiver 210 (see FIG. 3) as mentioned above. This process is termed 'beamforming' and is implemented digitally rather than utilising the passive (analogue) feeder network referred to above.

The individual first protocol receive signal 70Rx-1, 70Rx-2, . . . , 70Rx-N and the individual second protocol receive signal 75Rx-1, 75Rx-2, . . . , 75Rx-N are forwarded in the receive direction in a step 1330.

FIG. 4*b* shows details of the forwarding step 1330. In a step 1340 the individual first protocol receive signal 70Rx-1, 70Rx-2, . . . , 70Rx-N is extracted. The extracting step 1340 may be implemented using the second splitter 100*b*-1, 100*b*-2, . . . , 100*b*-N. The extracting step 1340 may comprise a filtering of the amplified signals generated in the amplifying step 1200. The filtering may be implemented using the second splitter 100*b*-1, 100*b*-2, . . . , 100*b*-N.

A step 1350 comprises an extracting of the individual second protocol receive signal 75Rx-1, 75Rx-2, . . . , 75Rx-N.

The extracting step 1350 may be implemented by the first coupler 110*a*-1, 110*a*-2, . . . , 110*a*-N. As mentioned previously, the extracting step 1350 may comprise a filtering of the individual first protocol receive signal 70Rx-1, 70Rx-2, . . . , 70Rx-N and the individual second protocol receive signal 75Rx-1, 75Rx-2, . . . , 75Rx-N after being amplified in the amplifying step 1200.

The filtering may without any limitation be implemented by the second protocol receiver and/or the second protocol transceiver 210 receiving the individual second protocol receive signal 75Rx-1, 75Rx-2, . . . , 75Rx-N. The second protocol transceiver is shown in outline in FIG. 3.

The method 1000 further comprises a step 1400 of concurrently transmitting the individual first protocol transmit signal 70Tx-1, 70Tx-2, . . . , 70Tx-N and the individual second protocol transmit signal 75Tx-1, 75Tx-2, . . . , 75Tx-N. The individual one of the first protocol transmit signal 70Tx-1, 70Tx-2, . . . , 70Tx-N and an individual one of the second protocol transmit signal 75Tx-1, 75Tx-2, . . . , 75Tx-N may be combined using the second coupler 110*b*-1, 110*b*-2, . . . 110*b*-N.

Figure 4C:
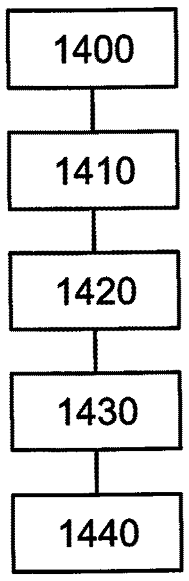
FIG. 4*c* shows details of a concurrently transmitting

The method 1000 comprises a concurrently transmitting 1400 of the individual first protocol transmit signal 70Tx-1, 70Tx-2, . . . , 70Tx-N and the individual second protocol transmit signal 75Tx-1, 75Tx-2, . . . , 75Tx-N (see FIG. 4*a*). FIG. 4*c* shows details of the step 1400.

Figure 1:
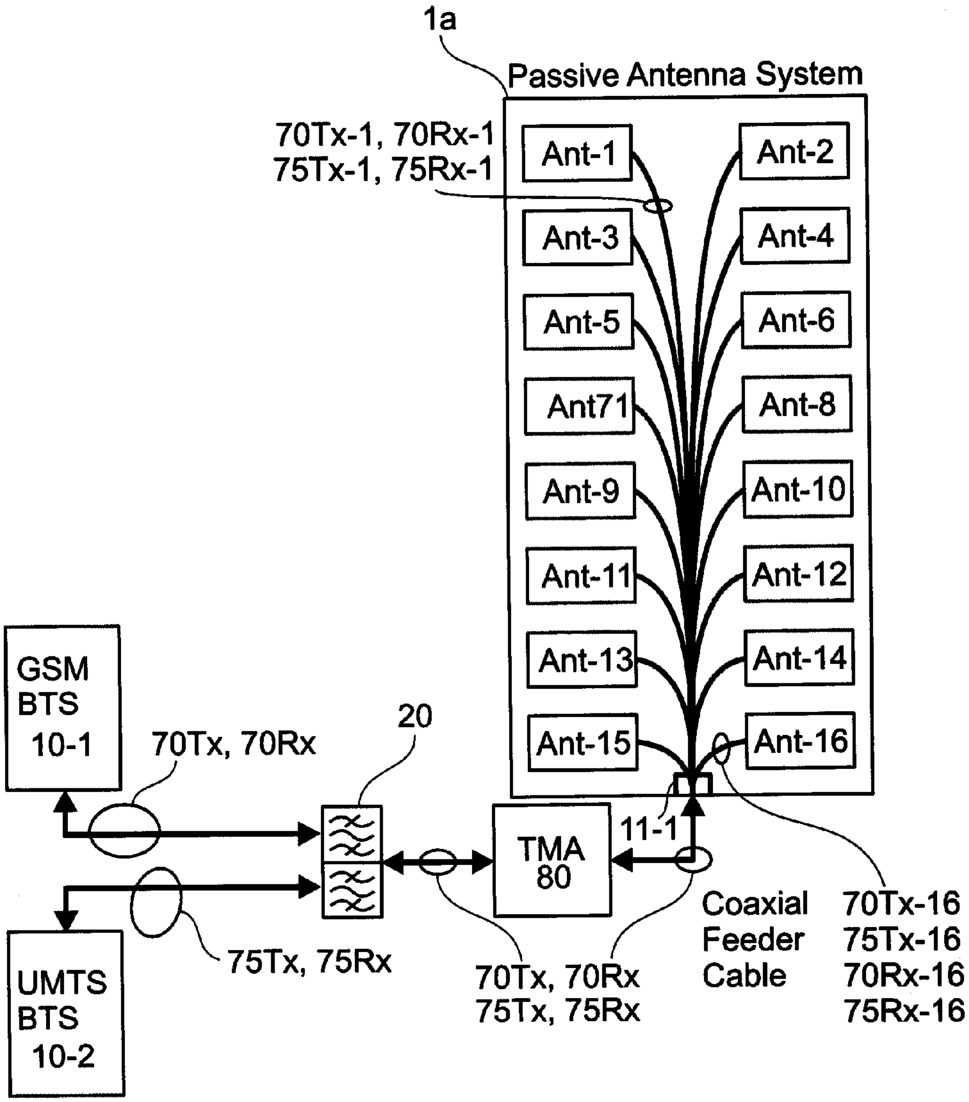
Fig. 1 Prior Art
FIG. 1 shows an antenna array of the prior art

In a step 1410 at least one individual first protocol transmit signal 70Tx-1, 70Tx-2, . . . , 70Tx-N is generated from the general first protocol transmit signal 70Tx. The individual first protocol transmit signal 70Tx-1, 70Tx-2, . . . , 70Tx-N may be generated by analogue means, applying at least one of a phase weighting, an amplitude weighting or a delay to the general first protocol transmit signal 70Tx. The analogue methods for applying the phase weighting, amplitude weighting or the delay to the general first protocol transmit signal 70Tx are known in the art as beam forming Antenna arrays 1*a* of the prior art may provide the phase weighting, the amplitude weighting or the delay by the corporate feeder network running from the first port 11-1 to the individual antenna element Ant-1, Ant-2, . . . , Ant-N (as shown in FIGS. 1 and 3).

Typically, the phase weighting, the amplitude weighting or the delay between individual ones of the antenna elements Ant-1, Ant-2, . . . , Ant-N is fixed for an antenna array 1*a* of the prior art. There may be a set of phase weightings, amplitude weightings or delays between individual ones of the antenna element Ant-1, Ant-2, . . . , Ant-N in the prior art. The set of phase weightings, amplitude weightings or the delays may be provided using a set of passive phase shifters as known in the art. The phase weighting, the amplitude weighting or the delay are applied in the analogue domain or by analogue means. The passive phase shifters do not typically provide an arbitrary phase weighting, an arbitrary amplitude weighting or an arbitrary delay for the general first protocol transmit signal 70Tx. Remote electrical tilt (RET) systems utilise electro-mechanically variable phase shift elements to vary a beam pattern relayed by the prior art antenna array 1*a*. RET systems will act on all transmit signals fed to the prior art antenna 1*a* and will not act separately for first protocol transmit signals 70Tx-1, 70Tx-2, . . . , 70Tx-N and second protocol transmit signals 75Tx-1, 75Tx-2, . . . , 75Tx-N.

A step 1420 comprises a generating of the individual second protocol transmit signals 75Tx-1, 75Tx-2, . . . , 75Tx-N. The individual second protocol transmit signals are generated from the general second protocol transmit signal 75Tx by digitally applying a variable phase weighting, a variable amplitude weighting or a variable delay (or a combination of some or all of these) to the general second protocol transmit signal 75Tx. The variable phase weighting, the variable amplitude or the variable delay are not limited by the use of passive phase shifters. In contrast the active antenna array 1 provides a larger flexibility with the variable phase weighting, the variable amplitude weighting or the variable delay than the passive phase shifters in the prior art. A beam forming for the individual second protocol transmit signals 75Tx-1, 75Tx-2, . . . , 75Tx-N is of increased flexibility due to the variable phase weighting, the variable amplitude weighting or the variable delay.

In a step 1430 the individual first protocol transmit signal 70Tx-1, 70Tx-2, . . . , 70Tx-N is forwarded in the transmit direction. The forwarding 1430 may be implemented using the second splitter 100*b*-1, 100*b*-2, . . . , 100*b*-N as shown in FIG. 3.

In a step 1440 the individual second protocol transmit signal 75Tx-1, 75Tx-2, . . . , 75Tx-N is combined with the individual first protocol transmit signal 70Tx-1, 70Tx-2, . . . , 70Tx-N. The step 1440 may be implemented using the second coupler 110*b*-1, 110*b*-2, . . . , 110*b*-N as shown in FIG. 3.

It is to be understood that the method 1000 of relaying radio signals is explained for an individual one of the antenna elements Ant-1, Ant-2, . . . , Ant-N. If there is more than one of the antenna elements Ant-1, Ant-2, . . . , Ant-N the method 1000, as explained with respect to FIGS. 4*a* to 4*c*, is applicable to each one of the relay paths terminated by the individual antenna elements Ant-1, Ant-2, . . . , Ant-N.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

REFERENCE NUMERALS

1*a* prior art antenna array
1 active antenna array
Ant-1, Ant-2, . . . , Ant-N at least one antenna element
10-1 first protocol BTS
10-2 second protocol BTS
11-1 first port
11-2 second port
100*a*-1, 100*a*-2, . . . , 100*a*-N at least one first splitter
100*b*-1, 100*b*-2, . . . , 100*b*-N at least one second splitter
200-1, 200-2, . . . , 200-N at least one amplifier
70Tx general first protocol transmit signal
75Tx general second protocol transmit signal
70Rx general first protocol receive signal
75Rx general second protocol receive signal
70Rx-1, 70Rx-2, . . . , 70Rx-N individual first protocol receive signal
70Tx-1, 70Tx-2, . . . , 70Tx-N individual first protocol transmit signal
75Rx-1, 75Rx-2, . . . , 75Rx-N individual second protocol receive signal
75Tx-1, 75Tx-2, . . . , 75-Tx-N individual second protocol transmit signal
110*a*-1, 110*a*-2, . . . , 110*a*-N at least one first coupler
110*b*-1, 110*b*-2, . . . , 110*b*-N at least one second coupler
210 second protocol receiver or transceiver
1000 method for relaying first protocol and second protocol radio signals
1100 concurrently receiving individual first protocol and individual second protocol receive signals
1200 amplifying individual first protocol and individual second protocol receive signals
1300 forming second general receive signal
1320 extracting individual first protocol receive signal
1330 extracting individual second protocol receive signal
1340 forwarding individual first and second protocol receive signals
1350 forming first general receive signal
1400 concurrently transmitting first and second protocol receive signals
1410 generate individual first protocol transmit signal 70Tx-1, 70Tx-2, . . . , 70Tx-N
1420 generate individual second protocol transmit signal
1430 forwarding individual first protocol transmit signal
1440 adding individual second protocol transmit signal

The invention claimed is:

1. An active antenna array for a mobile communications network comprising:

a plurality of antenna elements for relaying first protocol radio signals and second protocol radio signals;

at least one first splitter, coupled to an individual one of the plurality of antenna elements, adapted to forward at least one of at least one individual first protocol receive signal and at least one individual second protocol receive signal in a receive direction from an individual one of the plurality of antenna elements;

at least one amplifier, coupled downstream to the at least one first splitter, for amplifying at least one of the at least one individual first protocol receive signal or the at least one individual second protocol receive signal;

at least one first coupler coupled to the at least one amplifier, in the receive direction downstream of the at least one amplifier, the at least one first coupler being coupled to at least one second splitter and being adapted to forward, on a first path, the at least one individual first protocol receive signal to the least one second splitter, the at least one first coupler being further coupled to a second protocol receiver and being adapted to forward, on a second path, the at least one individual second protocol receive signal to said second protocol receiver; and the at least one second splitter located in the receive direction downstream of the at least one coupler and coupled to a passive feeder network or cable, adapted to forward the at least one individual first protocol receive signal in the receive direction to said passive feeder network or cable and further adapted to forward at least one individual first protocol transmit signal in a transmit direction along a transmit path.

2. The active antenna array according to claim 1, comprising at least one first coupler located in the transmit direction downstream of the at least one second splitter, the at least one first coupler adding at least one individual second protocol transmit signal to the at least one individual first protocol transmit signal.

3. The active antenna array according to claim 2, wherein the at least one first protocol transmit signal is generatable from a general first protocol transmit signal at a first port by applying at least one of a phase weighting, an amplitude weighting or a delay to the general first protocol transmit signal; and wherein the at least one individual second protocol transmit is generatable from a general second protocol transmit signal at a second port by applying at least one of a variable phase weighting, a variable amplitude weighting or a variable delay to the general second protocol transmit signal.

4. The active antenna array according to claim 3, wherein the first port is further adapted to provide a general first protocol receive signal; and wherein the second port is further adapted to provide at least one of a general second protocol receive signal or the at least one individual second protocol receive signal.

5. The active antenna array according to claim 2, wherein the at least one first splitter is adapted to forward the at least one individual first protocol transmit signal and the at least one individual second protocol transmit signal to the individual one of the antenna elements.

6. The active antenna array according to claim 1, wherein the plurality of antenna elements is adapted for at least one of concurrently transmitting the at least one individual first protocol transmit signal and the at least one individual second protocol transmit signal or concurrently receiving the at least one individual first protocol receive signal and the at least one individual second protocol receive signal.

7. The active antenna array according to claim 1, wherein the first protocol pertaining to the first protocol radio signals is selected from the group consisting of a GSM protocol and an UMTS protocol.

8. The active antenna array according to claim 1, wherein the second protocol pertaining to the second protocol radio signal is selected from the group consisting of a UMTS protocol, a third generation long term evolution protocol, a Freedom of Mobile Multimedia Access radio protocol, a wide Code Division Multiple Access radio protocol.

9. The active antenna array according to claim 1, wherein the at least one second duplexer forwards the at least one individual first protocol transmit signal to the at least one first splitter.

10. The active antenna array according to claim 1, being adapted to provide at least one of a variable phase weighting, a variable amplitude weighting, or a variable delay to the at least one individual second protocol receive signal.

11. The active antenna array according to claim 1, adapted to provide at least one of a phase weighting, an amplitude weighting or a delay to the at least one individual first protocol receive signal.

12. Method for relaying first protocol radio signals and second protocol radio signals in a mobile communications network, the method comprising:

concurrently receiving, by an individual one of plurality of antenna elements, at least one individual first protocol receive signal and at least one individual second protocol receive signal in a plurality of receive paths;

amplifying, by at least one amplifier, the at least one individual first protocol receive signal and the at least one individual second protocol receive signal;

forming, by a corporate feeder network, a general first protocol receive signal from the at least one individual first protocol receive signal by analogue means, and applying, by the corporate feeder network, at least one of a phase weighting, an amplitude weighting or a delay to at least a selected one of the at least one individual first protocol receive signal;

forming, by a second protocol receiver, a general second protocol receive signal from the at least one individual second protocol receive signal by digitally applying at least one of a variable phase weighting, a variable amplitude weighting or a variable delay to at least a selected one of the at least one individual second protocol receive signal; and forwarding, by at least one of a first coupler and a second splitter, of at least one of the individual first protocol receive signal and the at least one individual second protocol receive signal in a receive direction;

concurrently transmitting, by at least one of the second splitter and a second coupler, the at least one individual first protocol transmit signal and the at least one individual second protocol transmit.

13. The method according to claim 12, wherein the at least one of the phase weighting, the amplitude weighting or the delay applied by analogue means in the forming of the general first protocol receive signal is independent from the phase weighting, the amplitude weighting or the delay applied digitally in the forming of the general second protocol receive signal.

14. The method according to claim 13, the concurrently transmitting comprising:

generating at least one individual first protocol transmit signal from a general first protocol transmit signal by analogue means and applying at least one of a phase weighting, an amplitude weighting or a delay to the general first protocol transmit signal; and generating at least one individual second protocol transmit signal from a general second protocol transmit signal by digital means and applying at least one of a variable phase weighting, a variable amplitude weighting or a variable delay to the general second protocol transmit signal;

forwarding, by the second splitter, the at least one individual first protocol transmit signal in a transmit direction; and adding, by the second coupler, the at least one individual second protocol transmit signal to the at least one individual first protocol transmit signal.

15. The method according to claim 12, the forwarding comprising:

Extracting, by the second splitter, the at least one individual first protocol receive; and Extracting, by the first coupler, the at least one individual second protocol receive signal.

16. A computer program product stored on a non-transitory medium and comprising a non-volatile computer readable medium having control logic stored therein for causing a computer to manufacture an active antenna array for a mobile communications network, the active antenna array comprising:

at least one first splitter, coupled to an individual one of the plurality of antenna elements, adapted to forward at least one of at least one individual first protocol receive signal and at least one individual second protocol receive signal in a receive direction from an individual one of the plurality of antenna elements;

at least one amplifier, coupled downstream to the at least one first splitter, for amplifying at least one of the at least one individual first protocol receive signal or the at least one individual second protocol receive signal downstream of the at least one first splitter; and at least one first coupler, coupled to the at least one amplifier, in the receive direction downstream of the at least one amplifier, the at least one first coupler being coupled to at least one second splitter and being adapted to forward, on a first path, the at least one individual first protocol receive signal to the at least one second splitter, the at least one first coupler being further coupled to a second protocol receiver and being adapted to forward, on a second path, the at least one individual second protocol receive signal to said second protocol receiver; and the at least one second splitter located in the receive direction downstream of the at least one coupler and coupled to a passive feeder network or cable, adapted to forward the at least one individual first protocol receive signal in the receive direction to said passive feeder network or cable and further adapted to forward at least one individual first protocol transmit signal in a transmit direction along a transmit path.

17. A computer program product stored on a non-transitory medium and comprising a non-volatile computer readable medium having control logic stored therein for causing a computer to execute a method for relaying first protocol radio signals and second protocol signals in a mobile communications network, the control logic comprising:

first computer readable program code means for causing the computer to concurrently receive at least one individual first protocol receive signal and at least one individual second protocol receive signal; and second computer readable program code means for causing the computer to amplify the at least one individual first protocol receive signal and the at least one individual second protocol receive signal; and third computer readable program code means for causing the computer to form a general first protocol receive signal from the at least one individual first protocol receive signal by analogue means and applying at least one of a phase weighting, an amplitude weighting or a delay to at least a selected one of the at least one individual first protocol receive signal; and fourth computer readable program code means for causing the computer to form a general second protocol receive signal from the at least one individual second protocol receive signal by digital means and applying at least one of a variable phase weighting, a variable amplitude weighting or a variable delay to at least a selected one of the at least one individual second protocol receive signal;

fifth computer readable program code means for forwarding, by at least one of a first coupler and a second splitter, of at least one of the individual first protocol receive signal and the at least one individual second protocol receive signal in a receive direction; and sixth computer readable program code means for concurrently transmitting, by at least one of the second splitter and a second coupler, the at least one individual first protocol transmit signal and the at least one individual second protocol transmit.

18. A chip set for controlling an active antenna element for a mobile communications network, the chipset comprising:

at least one first splitter adapted to forward at least one of at least one individual first protocol receive signal and at least one individual second protocol receive signal in a receive direction;

at least one amplifier, for amplifying at least one of the at least one individual first protocol receive signal or the at least one individual second protocol receive signal downstream of the at least one first splitter; and at least one first coupler, coupled to the at least one amplifier, in the receive direction downstream of the at least one amplifier, the at least one first coupler being coupled to at least one second splitter and being adapted to forward, on a first path, the at least one individual first protocol receive signal to the least one second splitter, the at least one first coupler being further coupled to a second protocol receiver and adapted to provide the at least one individual second protocol receive signal to said second protocol receiver; and at least one second splitter located in the receive direction downstream of the at least one coupler and adapted to forward the at least one individual first protocol receive signal in the receive direction to a passive feeder network or cable and further adapted to forward at least one individual first protocol transmit in a transmit direction along a transmit path.

* * * * *